United States Patent [19]

Hartline, III et al.

[11] 3,953,194

[45] Apr. 27, 1976

[54] PROCESS FOR RECLAIMING CEMENTED METAL CARBIDE

[75] Inventors: Albert G. Hartline, III, Albany, N.Y.; John A. Campbell, Auburn Heights, Mich.; Theodore T. Magel, Coraopolis, Pa.

[73] Assignee: Allegheny Ludlum Industries, Inc., Pittsburgh, Pa.

[22] Filed: June 20, 1975

[21] Appl. No.: 588,566

[52] U.S. Cl. ............................. 75/.5 BC; 75/203; 75/204; 75/211; 75/213; 423/440
[51] Int. Cl.² ....................... B22F 1/00; B22F 1/04
[58] Field of Search ................. 75/.5 BC, 211, 203, 75/204, 213; 423/440

[56] References Cited
UNITED STATES PATENTS

| | | | |
|---|---|---|---|
| 2,407,752 | 9/1946 | Trent | 423/440 |
| 3,438,730 | 4/1969 | Shwayder | 423/440 |

*Primary Examiner*—W. Stallard
*Attorney, Agent, or Firm*—Vincent G. Gioia; Robert F. Dropkin

[57] ABSTRACT

There is disclosed a process for reclaiming cemented metal carbide material by first subjecting the metal carbide material to catastrophic oxidation to produce a mixture of metal oxide and the oxide of the cement, reducing the metal oxide either mixed with the cement oxide or after being separated from it, and finally carburizing the reduced metal.

19 Claims, No Drawings

PROCESS FOR RECLAIMING CEMENTED METAL CARBIDE

BACKGROUND OF THE INVENTION

Cemented carbide tools are made by consolidating extremely hard and extremely fine metal carbide particles together with a suitable binder or cement. Typical of such tools are those made of tungsten carbide cemented with cobalt. Although the tungsten carbide tools are the most widely used, hard carbides of other metals such as titanium, vanadium, chromium or molybdenum may also be used. All of the metals that produce hard carbides are relatively expensive metals.

Cobalt is the most widely used cementing material although other cementing materials may be employed, such as iron, nickel, chromium or molybdenum. Although the cementing materials are all metals, they will be referred to herein as coments; and their oxides will be referred to herein as cement oxides in order to distinguish them from the carbide-forming metals and metal oxides which will be referred to herein as metals and metal oxides.

When tools become worn or when tools are prepared with flaws that make them inadequate, it is desirable to reclaim the expensive metal carbide. Known methods for reclaiming metal carbides are either so expensive or so difficult to effect that they are not presently used; or, if used, the economy of such reclaiming processes is marginal. Among the known methods for reclaiming metal carbides are purely mechanical methods that involve extensive pulverization of the cemented carbides to reduce them to small enough particles so that they are separated from their cement and are capable of being reconsolidated. To reduce cemented carbides to such small sizes requires first milling them to a course powder and then injecting that course powder into a high velocity gas stream which directs the particles against a hard target, such as a metal carbide, where they shatter on impact. This process suffers from incomplete separation of metal carbides from the binding material; it uses expensive equipment; and it requires classification of the product according to size and recycling in order to recover significant amounts of the metal carbide.

Another technique employs liquid-phase zinc to dissolve the cement, thereby freeing metal carbide particles. This process must use large amounts of zinc and must circulate molten metal under a protective atmosphere to avoid oxidation. The process also requires treating the zinc-cement solution to recover the cement from the zinc, to recover the cement value, and to restore the zinc for reuse in the process. This process requires a great deal of expensive equipment and involves the difficulty of handling molten metal.

Another technique for reclaiming metal carbides is to dissolve the cement in an aggressive chemical medium such as boiling ferric chloride-hydrogen chloride solutions. Long time periods are required for chemical attack on the dense cemented carbide material to be effective. In addition, a great deal of special equipment must be employed to handle the aggressive solutions and to recover dissolved cement from them.

Another method for reclaiming cemented carbide materials is to treat them with a vapor phase mixture of chlorine gas, carbon monoxide and sulfur. This process is a slow process to effect, and it employs extremely dangerous gases which must be used with special caution and with special equipment.

THE INVENTION

The process of the present invention is a rapid, complete and inexpensive method for reclaiming cemented carbide. The process of the present invention involves four stages, although some of the stages may be combined as will be set forth hereinbelow.

The first stage in the process is catastrophic oxidation of the cemented carbides from which metal carbides are to be reclaimed. Catastrophic oxidation is effected at a temperature of at least 1100°F in the presence of oxygen. The process may be improved or hastened if a high partial pressure of oxygen is involved. For example, the oxidation stage may be carried out in air, in air enriched with oxygen, in pure oxygen, or in air under superatmospheric pressure. The temperature must be at least 1100°F but it may be as high as desired, limited only by the characteristics of the material being oxidized. For example, oxidation should not be carried out at temperatures that exceed the melting point or the boiling point of the oxides that are formed. The oxidation may also be hastened by breaking the cemented carbide material into small pieces although milling to a fine powder is not required.

Oxidation of the cemented carbide material also involves oxidation of the cement. For example, a material made of tungsten carbide cemented with cobalt, when subjected to the oxidation step, will result in a tungsten oxide - cobalt oxide mixture as well as some intermetallic compounds of oxygen, cobalt and tungsten. Oxidation is effected, according to the process of this invention, until substantially all of the carbon has been removed. Ordinarily, oxidation of a metal carbide can be effected at any temperature wherein the metal itself can be oxidized completely. Tungsten carbide cemented with cobalt can be oxidized readily at 1400°F to remove substantially all of the carbon, but if it is oxidized at temperatures substantially higher than 1600°F, tungsten oxide begins to vaporize from the cemented metal carbide as it forms.

The product from the oxidation stage is a mass of metal oxide that is no longer cemented and one that can be crushed to a very fine powder readily. The powder is a mixture of metal oxide particles and cement oxide particles. This mixed oxide powder may, if desired, by subjected to a separation process wherein the metal oxide powder is separated from the cement oxide powder. This separation process usually will only be employed if it is required for subsequent processing steps. Typically, the cement oxide will be separated from the metal oxide if the following reduction or carburizing steps must be effected at such high temperatures that the cement or its compounds would vaporize or melt. Separation may also be effected when it is necessary to chemically purify the metal carbide before it can be used for example in cases where the metal carbide is being reclaimed because it is inadequate due to impurities. Whenever possible, the cement oxide will not be separated from the metal oxide in that both can be reclaimed together to provide a mixed powder suitable for consolidation to form cemented metal carbide tools if they are treated together.

The second stage of the process is subdivision of the metal oxide. As stated above, subdivision of the metal oxide is readily accomplished in that the oxidized cement does not hold the oxidized carbide particles together firmly. In fact, the cement oxide also may be readily subdivided. Subdivision can be accomplished by simple crushing or milling by any of the known techniques, and with very minimal amount of crushing or milling the oxides are reduced to a fine powder. Ordinarily, if the cement oxide is to be separated from the metal oxide, the separation will be effected on the subdivided powders.

The third stage in the process is reduction of the metal oxide or the combined metal oxide-cement oxide powder to an oxygen content of at most 0.5% w. Reduction is effected by contacting the metal oxide powder or the mixed metal oxide-cement oxide powders with a reducing gas at conditions to effect substantially complete reduction of all of the oxides. Reducing gases may include hydrogen, hydrocarbons such as methane, or carbon monoxide. The preferred reducing gas is hydrogen. When reduction is effected with carbon monoxide or hydrocarbon gas, depending upon the conditions chosen, the metal may be partially or completely carburized during the reduction process. The conditions maintained during the reduction process will depend upon which metal is being treated. By way of example, tungsten oxide may be reduced at temperatures as low as 1290°F when contacted with hydrogen. The cement oxide is reduced at a substantially lower temperature and will always be reduced at a temperature at which the metal oxide is reduced. For example, cobalt oxide may be reduced with hydrogen at temperatures as low as 575°F. Some metal oxides, most notably titanium oxide, cannot be reduced and carburized at low temperature. For example, the combined reduction and carburization of titanium oxide by treating it with a mixture of hydrogen and methane requires temperatures as high as 3000°F to be completed. At such high temperatures, any of the common cement metals melt and produce a useless product. Thus, reduction and carburization of titanium oxide cannot be effected while it is mixed with the cement oxide powder.

The fourth stage of the process of the present invention involves carburization of the metal powder. Carburization is effected by contacting the reduced metal with carbon that is available to react with it at conditions wherein the reaction between metal and carbon can be effected. Available carbon may be carbon per se or carbon compounds that will decompose to provide carbon available to react with the metal. By way of example, lamp black or powdered graphite may be intimately mixed with the metal powder or metal oxide powder, or the powder may be contacted with hydrocarbon gas, hydrocarbon-hydrogen gas mixtures or carbon monoxide. Carbon dioxide is not a source of available carbon. Carburization of tungsten or of tungsten oxide can be effected by contacting with carbon monoxide or with methane or with a hydrocarbon gas-hydrogen mixture at temperatures of at least 1600°F. Carburization can also be effected by heating the metal powder mixed with powdered graphite or carbon black at temperatures of at least 2200°F in the absence of air. Carburization of tungsten-cobalt metal powders or their mixed oxides should be effected at temperatures between 1600°F and 2365°F because temperatures higher than 2365°F cause undesirable grain growth.

The result of the process of this invention is a stable metal carbide compound alone or mixed with a suitable cement. The product from the process may be used per se as a suitable material to be consolidated into cemented metal carbide tools by methods known to the art, or it may be mixed with virgin material to produce cemented metal carbide products meeting all the specifications that products from the virgin material alone can meet. Except for an oxidizing furnace, no extra equipment is necessary to effect the process of the present invention other than that required for the production of cemented metal carbide tools from virgin material. The cost of metal carbide reclaimed according to the process of this invention has been less than half of the cost of the virgin material.

DETAILED DESCRIPTION OF THE INVENTION

Following are a number of examples of both laboratory and production scale processes embodying the present invention.

EXAMPLE 1

Example 1 illustrates a laboratory scale process to reclaim cemented carbide scrap containing 13%w cobalt and 87%w tungsten carbide. A quantity of this scrap was oxidized in air at atmospheric pressure in a furnace maintained at 1600°F. After 24 hours of oxidation, the scrap was examined; and it was found that small pieces were completely oxidized while larger pieces still had solid cemented carbide at the core. The scrap was returned to the furnace for another 24 hours of oxidation in air at 1600°F after which the oxidation was found to be complete. The oxidized scrap had the consistency of chalk, and it was readily crushed to a fine powder with a mortar and pestle.

The oxidized scrap was concurrently reduced and carburized by contacting the powdered oxide scrap with a gas mixture containing 10%v methane and 90% hydrogen for two hours at 2000°F. Analysis of the reduced, carburized scrap showed the carbon content of the powder to be 5.66%w and the oxygen content to be 0.152%w. This carbon content is stoichiometrically correct for tungsten carbide.

Test bars of consolidated cemented metal carbide were made by a conventional process. The process involved thoroughly mixing the carburized powder with 2%w wax and pressing the mixture into bars approximately ¼ inch × ¼ inch × 1 inch in size. The bars were pressed at 32,000 psi. After pressing, the bars were dewaxed by heating to 800°F for 1 hour, presintered by heating to 1600°F for 1 hour and finally sintered at 2550°F for 1 hour. All of the heating processes were effected in a hydrogen atmosphere. The resulting bars were machined to final dimensions. When the conventional consolidation procedure is effected properly, the resulting test bars meet all specifications for that grade of cemented carbide material.

EXAMPLE 2

Another laboratory scale process was effected by oxidizing 15 pounds of mixed scrap for 48 hours at 1400°F in air. The resulting oxide was ball milled for 24 hours, after which it was in the form of a fine powder. The powder was reduced by heating it to 1600°F in a hydrogen atmosphere for 2 hours. The reduced powder was analyzed and was found to contain 1.67%w tantalum, 8.80%w cobalt, 87.87%w tungsten, and 1.58%w oxygen. This powder was thoroughly mixed with 6.4%w lamp black and 2.8%w cobalt. The cobalt was added to adjust the composition to the desired end composition. The powder was heated to 2200°F for 2 hours in a hydrogen atmosphere. The resultant carburized cake contained 4.90%w carbon, 1.01%w tantalum, 9.75%w cobalt, and 84.06%w tungsten. The carbon value for this material was too low. Carbon loss was probably due to some oxygen leakage into the furnace and perhaps some reaction of carbon with hydrogen to produce methane. Accordingly, the powder was again thoroughly mixed with 1%w carbon black and returned to the furnace for two hours at 2000°F and under a hydrogen atmosphere. This procedure raised the carbon content of the powder to 5.37%w. When this powder was prepared properly as test bars by the procedure described above, the resultant material met all specifications for that grade of cemented metal carbide.

EXAMPLE 3

Approximately 50 pounds of steel cutting-grade cemented carbide scrap was oxidized in air for 45 hours at 1400°F. The resultant oxide was ball milled for 24 hours to produce a fine powder. The powder was analyzed and found to contain 2.82%w tantalum, 4.50%w titanium, 8.27%w cobalt, 60.1%w tungsten, and 22.5%w oxygen. The oxidized scrap powder was reduced in hydrogen at 1600°F for 2 hours. After cooling, the reduced powder was submerged in an aqueous solution of 10%w hydrogen chloride and 5%w hydrogen peroxide for 48 hours. The aqueous solution removed cobalt by converting it to soluble cobalt chloride, and the carbide-forming metals were oxidized by the hydrogen peroxide to their oxides. The carbide-forming metal oxides were filtered, washed, dried, and concurrently reduced and carburized by mixing 8%w lamp black with the oxide powders and heating them to 2700°F for 1 hour in a hydrogen atmosphere. The resultant carburized powder was found to contain 5.05%w of combined carbon, and its oxygen content was reduced to 0.152%w. When this powder was consolidated according to the methods of the prior art, the resultant test bars met all specifications for that grade of cemented metal carbide material.

EXAMPLE 4

A production scale batch of cemented carbide scrap was reclaimed by the process of this invention described as follows. 500 pounds of mixed grade tungsten carbide cemented with cobalt was oxidized in air at 1500°F for 72 hours. The 72 hour period was required because some of the scrap pieces were quite large. Intermediate sampling indicated that most of the scrap was completely oxidized after 48 hours in the furnace. The resultant oxide was a mixture of tungsten oxide and a compound $CoWO_4$, and it was found to have a consistency similar to chalk. The oxide was jaw-crushed and sieved to −4 mesh.

The oxide powder was then introduced into an oxide reduction furnace that is ordinarily used for reducing virgin tungsten to be prepared as tungsten carbide for cemented tungsten carbide material. The oxide powder moved through the furnace through three zones. The first zone was maintained at 1400°F; the second zone was maintained at 1635°F; and the third zone was maintained at approximately 1700°F. Hydrogen flowed through the furnace at a rate of 310 standard cubic feet per hour. The oxidized powder was passed through the furnace by being loaded into boats moving through the furnace. The boats contained about 1 killogram each of powder. The total time for subjecting the entire load of oxide powder to reduction was about six hours. The reduced tungsten-cobalt powder contained about 0.25% oxygen and about 7.50%w cobalt.

The reduced powder was blended uniformly with 6.05%w lamp black and was carburized at approximately 2190°F for one hour in a hydrogen atmosphere. The final carbon content of the powder was 5.87%w of combined carbon. It was estimated that the powder also contained about 0.2%w of free carbon. The resulting carburized cake was crushed and milled. The crushed and milled powder was blended with approximately an equal amount of virgin tungsten carbide and cobalt to which additional cobalt was added to adjust the composition to the desired amount (13%w cobalt, 87%w tungsten carbide). The mixed powders were milled for 72 hours under hexane, after which they were prepared as test bars using conventional procedures. The test bars met all specifications for that grade of cemented carbide material.

The equipment employed to reclaim the scrap in accordance with Example 4 was the equipment already in use for processing virgin material with the exception of the oxidizing furnace. The oxidizing furnace is a relatively simple piece of equipment in that it is an open air furnace and it requires only the capacity to maintain the temperature at 1600°F.

What is claimed is:

1. A process for reclaiming cemented metal carbide comprising
    A. oxidizing said cemented metal carbide by subjecting it to oxygen at a temperature of at least 1100°F for a time sufficient to convert metal carbide to metal oxide,
    B. subdividing the metal oxide to a powder,
    C. reducing the metal oxide powder by subjecting it to a reducing gas at a temperature and for a time to reduce the oxygen content of the powder to a maximum of 0.5% by weight, and
    D carburizing the reduced powder by subjecting it to available carbon at a temperature and for a time to convert said metal to metal carbide.

2. The process of claim 1 wherein said metal carbide is blended with cementing material and consolidated.

3. The process of claim 1 wherein said metal is tungsten, and it is oxidized at a temperature not higher than 1600°F.

4. The process of claim 3 wherein said temperature is not higher than 1400°F.

5. The process of claim 1 wherein said metal is tungsten, and it is reduced at a temperature in excess of 1500°F.

6. The process of claim 1 wherein said metal is tungsten, and it is carburized at a temperature of from about 1600°F to about 2200°F.

7. The process of claim 1 wherein said metal is separated from cement or compounds of cement prior to the step of carburizing said reduced powder.

8. The process of claim 7 wherein said cement or compounds of cement are removed from said metal by dissolving said cement or compounds thereof in an aqueous solution of HCl and $H_2O_2$.

9. The process of claim 1 wherein said metal is titanium, and it is carburized at a temperature higher than 3000°F.

10. The process of claim 1 wherein said cemented carbide is tungsten carbide cemented with cobalt, oxidizing is effected at a temperature not higher than 1600°F whereby mixed oxides of tungsten and cobalt are produced, reducing is effected at a temperature higher than 1500°F, and carburizing is effected between 1600°F and 2200°F, whereby a mixed powder of tungsten carbide and cobalt is recovered.

11. The process of claim 1 wherein said cemented carbide is titanium carbide cemented with cobalt and wherein cobalt oxide is separated from titanium oxide prior to reduction of titanium oxide.

12. The process of claim 1 wherein said metal carbide is tantalum carbide.

13. The process of claim 1 wherein said metal carbide is vanadium carbide.

14. The process of claim 1 wherein said metal carbide is chromium carbide.

15. The process of claim 1 wherein said metal carbide is molybdenum carbide.

16. The process of claim 1 wherein said cement is chromium.

17. The process of claim 1 wherein said cement is nickel.

18. The process of claim 1 wherein said cement is iron.

19. The process of claim 1 wherein said cement is molybdenum.

* * * * *